Sept. 28, 1954  W. L. LAWSON  2,690,105
CAMERA SHUTTER AND SWITCH MECHANISM
Filed March 31, 1951  3 Sheets-Sheet 1

INVENTOR
WILLIAM L. LAWSON
BY
ATTORNEY

Sept. 28, 1954    W. L. LAWSON    2,690,105
CAMERA SHUTTER AND SWITCH MECHANISM
Filed March 31, 1951    3 Sheets-Sheet 2

INVENTOR
WILLIAM L. LAWSON
BY
ATTORNEY

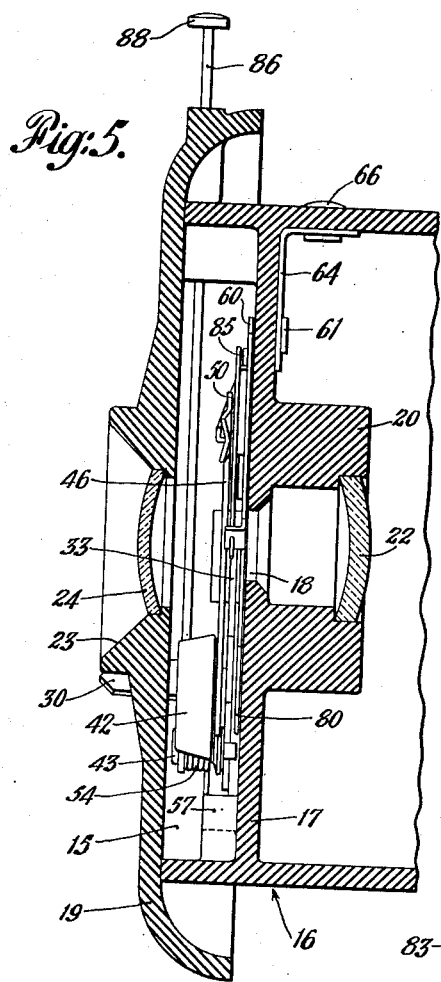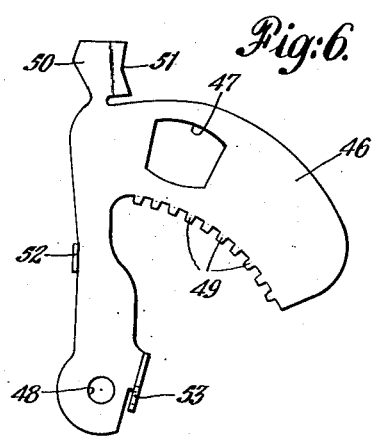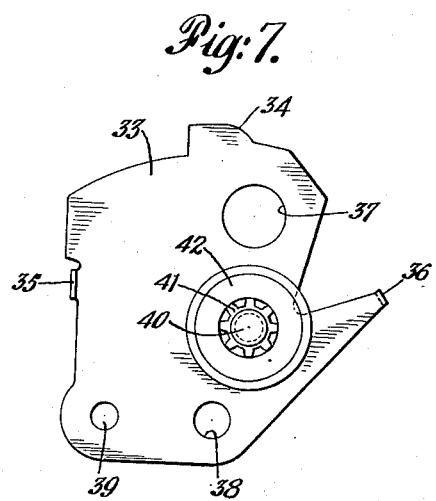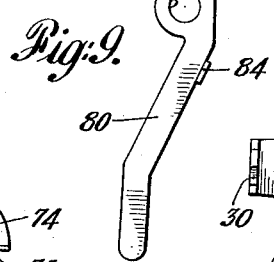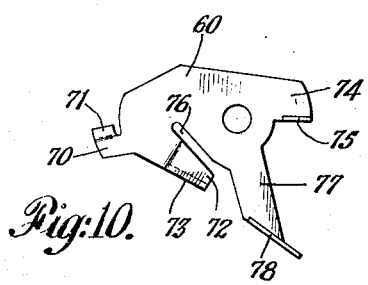

Patented Sept. 28, 1954

2,690,105

UNITED STATES PATENT OFFICE 2,690,105

CAMERA SHUTTER AND SWITCH MECHANISM

William L. Lawson, Forest Hills, N. Y., assignor to Whitehouse Products, Inc., Brooklyn, N. Y., a corporation of New York Application March 31, 1951, Serial No. 218,687

12 Claims. (Cl. 95—11.5)

This invention relates to cameras, and more particularly, to combined shutter and switch mechanisms for cameras that are adapted to take pictures with the aid of flash lamps.

There have been a number of worthwhile advances in the field of photography in recent years. However, one of the problems that has vexed the industry, but has not been successfully solved heretofore, has been the development of a relatively inexpensive flash-type camera shutter and switch mechanism that is capable of performing its intended functions in a simple, dependable and efficient manner, repeatedly and over an extended period of time. While numerous attempts have been made with the view of solving this problem, they have all fallen short of the mark. Present-day cameras of this type that are capable of satisfactory performance require costly tooling and the use of skilled labor, resulting in high manufacturing costs. Further, presently known low-cost flash cameras are lacking in the desirable characteristics of dependability, trouble-free operation and efficiency.

The instant invention, on the other hand, has successfully solved the problem stated above in that it provides a low-cost camera shutter and switch mechanism having improved and simplified features of construction and operation. For one thing, camera shutter and switch mechanisms constructed in accordance with this invention are capable of being manufactured by mass production methods, thereby materially reducing the initial cost. Experience has demonstrated that the maintenance cost of such shutter and switch mechanisms is correspondingly low due to the simple design and rugged construction embodied therein.

One of the outstanding features of the invention resides in the parts being so constructed and arranged that the film is exposed at the instant the light from the flash lamp is at peak intensity. This results in better film exposures than are attainable with cameras of comparable cost.

The primary object of the invention is to provide a camera shutter and switch mechanism that has improved features of construction and operation and that is capable of being manufactured by mass production methods.

Another object of the invention is to provide a camera shutter and switch mechanism of the character indicated having its parts so constructed and arranged that energization of the flash lamp and exposure of the film are so timed and synchronized that the film is exposed at the instant the light from the lamp reaches peak intensity.

Another object of the invention is to provide a camera shutter and switch mechanism that is simple, compact and sturdy in construction; that is reasonable in manufacturing cost and low in upkeep cost; and that is capable of performing its intended functions repeatedly and over an extended period of time in a dependable and trouble-free manner.

To the end that the foregoing objects may be readily attained, a flash-type camera, having a shutter and switch mechanism constructed in accordance with this invention, comprises a housing defining a compartment in which the mechanism is disposed. The housing includes a rear wall or support having a central exposure opening and a removable cover or face plate having a central light-admitting opening aligned with the exposure opening. Both openings may be provided with suitable lenses. A selector blade is pivotal with respect to the support and has a plurality of openings adapted to be successively aligned with the exposure opening, as desired. Overlying the selector blade is an aperture blade that is pivotally supported by the housing rear wall. The aperture blade has an opening that is adapted to be placed into and out of alignment with the exposure opening depending on the angular position of the aperture blade. An exposure blade is positioned forwardly of the aperture blade and is pivotally connected thereto about an axis spaced from the pivotal connection between the aperture blade and the housing rear wall. A spring normally and yieldingly urges the exposure blade in one direction about its pivotal axis with the aperture blade. The parts of the aperture and exposure blades are so constructed and arranged that this spring also pivots the aperture blade together with the exposure blade in one direction with respect to the housing rear wall as allowed by a stop. This spring normally maintains the aperture and exposure blades in a position whereby the openings therein are out of alignment with the exposure opening in the housing rear wall.

A switch member is pivotally connected to the housing rear wall at a location above the referred-to blades. This switch member is adapted to complete an electric circuit including a flash lamp. A spring normally and yieldingly urges the switch into closed position. A latch maintains the switch member in open position against the action of the last mentioned spring when the aperture and exposure blades are in normal position.

The apparatus is provided with means including the switch member for preventing movement of the exposure blade in one direction about its pivotal connection with the aperture blade while the switch member is retained in open position by the latch. The parts are so constructed and arranged that upon predetermined movement of the aperture blade in one direction about its pivotal connection with the housing rear wall, the latch is released, thereby permitting the switch member to be pivoted to closed position by its spring and the exposure blade to be correspondingly actuated by its spring about its pivotal connection with the aperture blade.

The enumerated objects, together with other objects and the advantages attainable by the practice of this invention, will be readily understood by persons skilled in the art from the following detailed description taken with reference to the accompanying drawings that, respectively, describe and illustrate a preferred camera shutter and switch mechanism constructed in accordance with the invention.

In the drawings wherein like reference numerals denote corresponding parts throughout the several views:

Figure 1 is a view in front elevation of a camera having its front cover plate removed and having incorporated therein a shutter and switch mechanism constructed in accordance with this invention, the parts of the mechanism being in a position of rest before an exposure is made;

Figure 2 corresponds to Figure 1 and shows the parts of the shutter and switch mechanism in another relative position, i. e., the position of such parts just before an exposure is made;

Figure 3 is another view corresponding to Figure 1 and shows the relative position of the parts of the shutter and switch mechanism at the instant an exposure is made;

Figure 4 also corresponds to Figure 1 and shows the relative position of the parts of the shutter and switch mechanism immediately after completion of an exposure;

Figure 5 is a view taken along line 5—5 of Figure 1 and illustrating the cover plate in position;

Figure 6 is a front elevational view of the exposure blade;

Figure 7 is a front elevational view of the aperture blade and a pinion and fly-wheel arrangement carried thereby;

Figure 8 is a front elevational view of the selector blade;

Figure 9 is a front elevational view of the latch;

Figure 10 is a front elevational view of a switch member for completing an electric circuit that includes a flash lamp.

Figure 1:
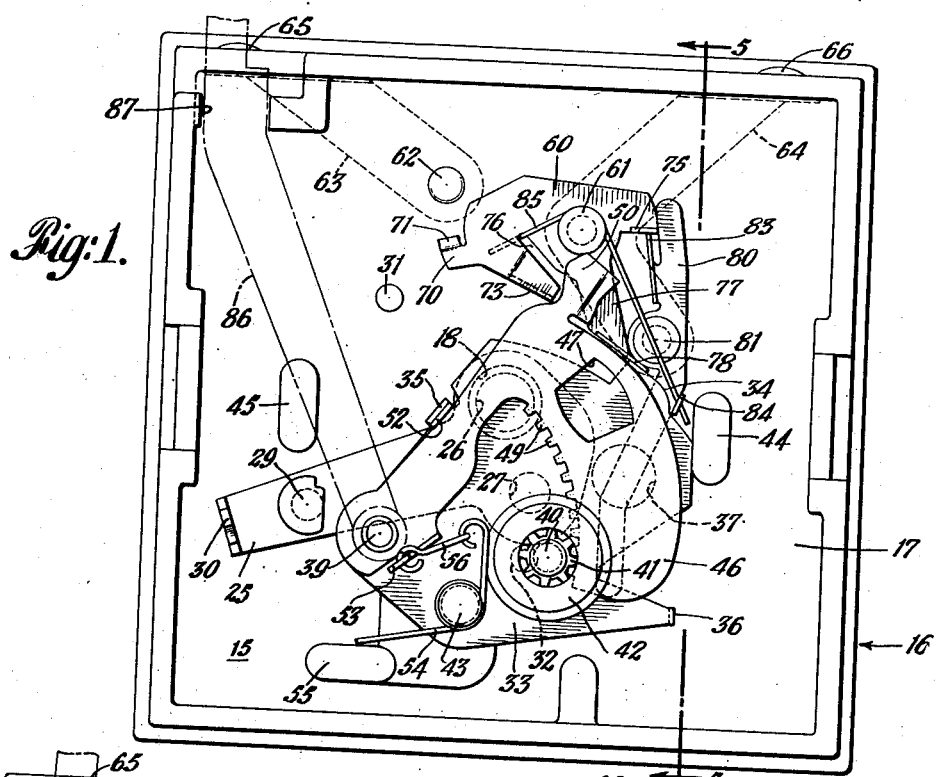
Figure 2:
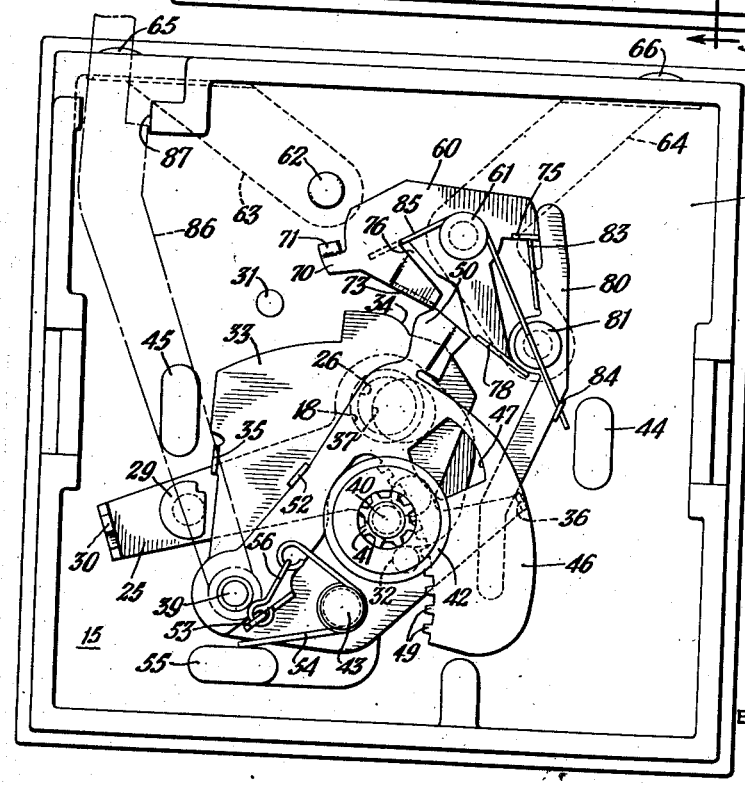

Referring first to Figure 5, the shutter and switch mechanism is mounted in a front compartment 15 of a shutter housing 16 which may be made of any desired material such as metal, a suitable synthetic plastic or the like. The housing includes a rear wall 17, having a central exposure opening 18, and a removable cover or face plate 19. Integral with rear wall 17 is a hollow extension 20 that is coaxial with exposure opening 18 and that carries a lens 22. Cover plate 19 has a flared central opening 23 that is aligned with exposure opening 18. A lens 24 is disposed across opening 23.

A selector blade 25, best shown in Figure 8, has a pair of spaced openings 26 and 27, the centers of which are equidistant from the center of a third opening 28. The selector blade is positioned immediately adjacent the inner surface of housing rear wall 17 and is pivotal about a rivet or the like 29 that is secured to wall 17 and extends through opening 28. The selector blade has a lateral extension 30 that projects through a slot (not shown) in cover plate 19 for manual actuation of the blade to place either of opening 26 or 27, as desired, in alignment with exposure opening 18. Housing rear wall 17 has a pair of spaced stop lugs 31 and 32 that limit pivotal movement of the selector blade about rivet 29. Thus, when the selector blade bears against stop lug 32, as shown in Figure 1, opening 26 is aligned with exposure opening 18. The selector blade may be rotated in a counterclockwise direction about rivet 29 into abutting relation with stop lug 31 whereby opening 27 will be placed in alignment with exposure opening 18, as desired. The blade may be releasably retained in selected angular position by means of a suitable detent or the like (not shown).

Reference is next had to Figure 7 for an understanding of the details of construction of an aperture blade 33. This blade has an upper camming edge 34 and is provided with a forwardly projecting tab 35 and a rearwardly projecting tab 36. Formed in blade 33 is a pair of openings 37 and 38. Opening 37 is adapted to register with exposure opening 18 and the selected opening in the selector blade. The blade has a pair of forwardly extending studs 39 and 40. Freely rotatable about stud 40 is a pinion 41. A flywheel 42 of suitable mass is press-fitted or otherwise secured to pinion 41 for rotation therewith. The aperture blade is pivotal with respect to housing rear wall 17 by means of a stud 43 that extends through opening 38 (Figure 1). Spaced lugs 44 and 45 integral with housing rear wall 17 limit clockwise and counterclockwise pivotal movement, respectively, of the aperture blade as viewed in Figures 1 to 4.

Carried by and positioned forwardly of the aperture blade is an exposure blade 46, best shown in Figure 6. This blade has an exposure window or opening 47 adapted to be placed in alignment or registration with corresponding openings in the housing and in the earlier described blades. The exposure blade also has a circular opening 48 for receiving stud 39, whereby to obtain a pivotal connection between the exposure blade and aperture blade 33 (Figure 1). Formed in the exposure blade is an arcuate rack made up of a series of teeth 49 adapted to mesh with successive teeth of pinion 41 upon rotation of the exposure blade about stud 39. The exposure blade has an integral extension or tab 50, a portion of which is bent forwardly and notched, as indicated at 51 in Figure 6. Also integral with the exposure blade is a pair of forwardly projecting tabs 52 and 53, the latter tab defining a notch with the body of the exposure blade.

A coil spring 54 is mounted on stud 43. One end of this spring bears against a lug 55 integral with housing rear wall 17 and the other end is coupled to a link 56 which is in turn connected to exposure blade tab 53. As will be apparent from an examination of Figure 1, spring 54 normally biases exposure blade 46 in a counterclockwise direction with respect to aperture blade 33 about the axis of stud 39. Such movement of the exposure blade relative to the aperture blade is limited by engagement of exposure blade tab 52 with aperture blade tab 35. Spring 54 also normally urges the aperture blade in a clockwise direction about stud 43 as viewed in Figure 1 to the extent allowed by stop lug 44.

Figure 11:
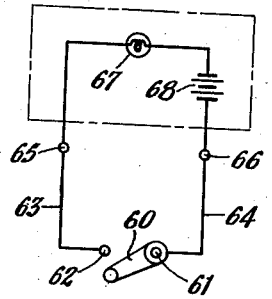
Figure 11 is a diagrammatic representation of an electric circuit showing a battery and flash lamp connected in series to the switch member.

A flash switch member 60 is an element of a series electric circuit shown diagrammatically in Figure 11 and including a stud 61 carried by housing rear wall 17, a contactor post or rivet 62, a pair of electrically conductive strips 63 and 64, and a pair of rivets 65 and 66. The foregoing elements of the electric circuit are carried by the camera and are shown in Figures 1 and 5. The electric circuit additionally includes a photoflash lamp 67 and an electric battery 68 for energizing the lamp. Switch member 60 is pivotal about stud 61 and, as best shown in Figure 10, is provided with a first finger 70 having a forwardly inclined upper portion 71; a second finger 72, inclined forwardly and carrying a rearwardly projecting tab 73; and a third finger 74 having a forwardly projecting tab 75. Finger 72 is spaced from the main body of the switch member and defines a slot 76 therewith. The switch member also includes an arm 77 intermediate fingers 72 and 74. This arm has a forwardly projecting tab 78.

The switch member is adapted to be releasably maintained in open position (Figures 1 and 2) by a latch member 80 that is pivotal about a stud 81 which is carried by and projects forwardly of housing rear wall 17. The latch member, as shown in Figure 9, has an opening 82, intermediate its ends, for the reception of stud 81. The latch member is provided with an upper tab 83 and a notched lower tab 84, both of which project forwardly.

A coil spring 85 is mounted on stud 61. One end of spring 85 projects through slot 76 and bears against switch member 60. The other end of this spring bears against notched lower tab 84 of the latch member. As shown in Figure 1, switch member 60, latch member 80 and coil spring 85 are so configured and arranged that the spring normally and yieldingly urges the switch member in a clockwise direction about stud 61 and latch member 80 in a counter-clockwise direction about stud 81.

An actuating rod 86 is pivotally connected at its lower end to stud 39. This rod is slidable through an opening 87 in the shutter housing. The upper end of rod 86 carriers a cap, head or the like 88 (Figure 5).

For the purpose of outlining the mode of operation of the illustrated embodiment of the invention, it is assumed that the same has been assembled and the parts are in the relative position shown in Figure 1. This is the normal position of the parts before an exposure is initiated, aperture blade opening 37 and exposure blade opening 47 being disposed out of alignment with exposure opening 18, and switch member 60 being held in open position by latch member 80, against the action of coil spring 85.

To effect an exposure, the operator depresses rod 86 by pressing downwardly on cap 88, thereby swinging aperture blade 33 in a counter-clockwise direction about stud 43, as viewed in Figure 1, against the action of spring 54. Initial counter-clockwise rotation of aperture blade 33 effects movement of that blade and exposure blade 46 from the relative position shown in Figure 1 to that shown in Figure 2. Exposure blade 46 is restrained against counter-clockwise movement about stud 39 since the left edge of tab 50 bears against and rides along the end of tab 73 of the switch member. As the aperture blade continues to move in a counter-clockwise direction from the position shown in Figure 2 to that illustrated in Figure 3, aperture blade tab 36 bears against the lower right edge of latch member 80 and causes the latch member to pivot in a clockwise direction about stud 81, thereby releasing switch member 60 from the latch member and permitting coil spring 85 to move the switch member in a clockwise direction and effecting contact between finger 70 and rivet 62. This completes the circuit to the flash lamp.

Figure 3:
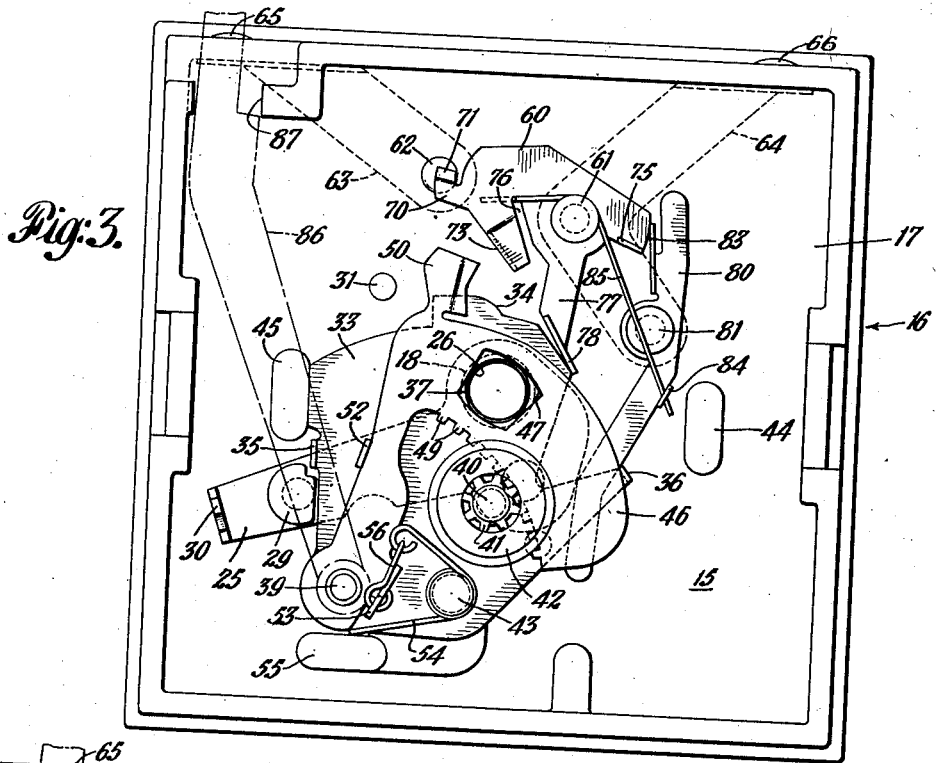

The circuit is closed in advance of the shutter parts arriving at the position shown in Figure 3, in which position exposure opening 18, selected opening 26 of the selector blade, opening 37 of the aperture blade and opening 47 of the exposure blade are in alignment. By closing the switch member in advance of the shutter parts attaining the relative position shown in Figure 3, the film is exposed at the instant the light from the flash lamp reaches peak intensity. It will be apparent that release of the switch member permits disengagement of the switch member from the exposure blade. Also, pivotal movement of the exposure blade about stud 39 under the influence of coil spring 54 is dampened or retarded due to the inertia of pinion 41 and flywheel 42, thereby controlling the exposure time of the film.

With the parts in the relative position shown in Figure 3, the aperture blade is at its limit of counter-clockwise rotation as it bears against stop lug 45. The exposure blade continues to move in a counter-clockwise direction about stud 39 under the action of spring 54, whereby its opening 47 is swung out of alignment with opening 37 of the aperture blade and exposure opening 18. The limit of counter-clockwise travel of the exposure blade and the relative position of the parts at the end of an exposure is shown in Figure 4.

Figure 4:
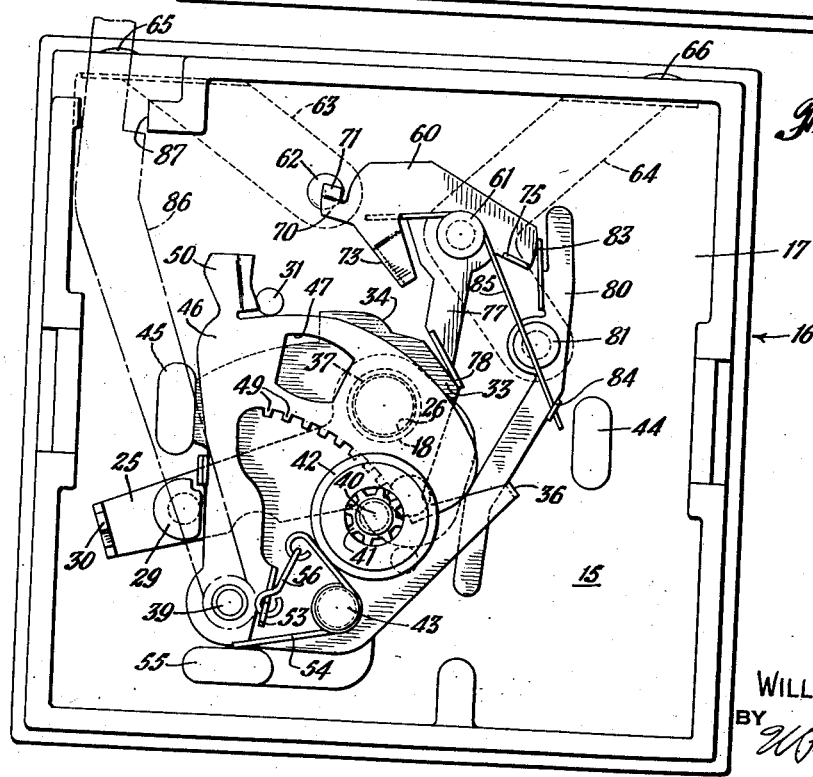

Upon release of actuating rod 86, coil spring 54 swings the aperture blade and the exposure blade in unison in a clockwise direction about stud 43 from the position shown in Figure 4 to that shown in Figure 1, thereby restoring the parts to their original relative position. In the course of such clockwise movement of the aperture blade, its camming edge 34 bears against tab 78 of the switch member and imparts counter-clockwise rotation of the switch member about stud 61. Also, aperture blade tab 36 is disengaged from latch 80 permitting latch tab 83 to reengage switch member tab 75 and maintain the switch in open position against the action of its spring 85. The shutter and switch mechanism are now ready to make another exposure of the film.

The terms and expressions which I have employed herein are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a camera shutter and switch mechanism, a support, an aperture blade pivotally connected to the support, an exposure blade carried by and movable with respect to the aperture blade, a switch member adapted to complete an electric circuit including a flash lamp, a latch carried by and movable with respect to the support and releasably maintaining the switch member in open position, and means for releasing the latch from the switch member in response to predetermined pivotal movement of the aperture blade in one direction, said aperture blade, exposure blade and switch member being so constructed and arranged as to operate in synchronism upon release of the latch from the switch member.

2. In a camera shutter and switch mechanism, a support, an aperture blade pivotally connected to the support, an exposure blade carried by and movable with respect to the aperture blade, a switch member adapted to complete an electric circuit including a flash lamp, resilient means normally and yieldingly urging the switch member into closed position, a latch carried by and movable with respect to the support and releasably maintaining the switch member in open position against the action of the resilient means, and means for releasing the latch from the switch member and permitting the resilient means to move the switch member into closed position in response to predetermined pivotal movement of the aperture blade in one direction, said aperture blade, exposure blade and switch member being so constructed and arranged as to operate in synchronism upon release of the latch from the switch member.

3. In a camera shutter and switch mechanism, a support, an aperture blade carried by and movable with respect to the support about a first pivotal axis, an exposure blade carried by and movable with respect to the aperture blade, a switch member adapted to complete an electric circuit including a flash lamp, a latch carried by and movable with respect to the support about a second pivotal axis, said latch releasably maintaining the switch member in open position, and means for releasing the latch from the switch member in response to predetermined movement of the aperture blade in one direction about said first pivotal axis, said aperture blade, exposure blade and switch member being so constructed and arranged as to operate in synchronism upon release of the latch from the switch member.

4. In a camera shutter and switch mechanism, a support, an aperture blade carried by and movable with respect to the support about a first pivotal axis, an exposure blade carried by and movable with respect to the aperture blade, a switch member carried by and movable with respect to the support about a second pivotal axis, said switch member being adapted to complete an electric circuit including a flash lamp, a latch carried by and movable with respect to the support about a third pivotal axis, said latch releasably maintaining the switch member in open position, and means responsive to predetermined movement of the aperture blade in one direction about said first pivotal axis for releasing the latch from the switch member and urging the switch member into closed position about said second pivotal axis, said aperture blade, exposure blade and switch member being so constructed and arranged as to operate in synchronism upon release of the latch from the switch member.

5. In a camera shutter and switch mechanism, a support, an aperture blade carried by and movable with respect to the support about a first pivotal axis, an exposure blade carried by and movable with respect to the aperture blade, a switch member carried by and movable with respect to the support about a second pivotal axis, said switch member being adapted to complete an electric circuit including a flash lamp, resilient means normally and yieldingly urging the switch member into closed position about said second pivotal axis, a latch carried by and movable with respect to the support about a third pivotal axis, said latch releasably maintaining the switch member in open position against the action of the resilient means, and means responsive to predetermined movement of the aperture blade in one direction about said first pivotal axis for releasing the latch from the switch member and permitting the resilient means to move the switch member into closed position, said aperture blade, exposure blade and switch member being so constructed and arranged as to operate in synchronism upon release of the latch from the switch member.

6. In a camera shutter and switch mechanism, a support, an aperture blade carried by and movable with respect to the support about a first pivotal axis, an exposure blade carried by and movable with respect to the aperture blade, a switch member carried by and movable with respect to the support about a second pivotal axis, said switch member being adapted to complete an electric circuit including a flash lamp, a latch carried by and movable with respect to the support about a third pivotal axis, a single spring normally and yieldingly urging the switch member into closed position about said second pivotal axis and the latch in a direction about said third pivotal axis to engage the switch member, said latch releasably maintaining the switch member in open position against the action of the spring, and means responsive to predetermined movement of the aperture blade in one direction about said first pivotal axis for releasing the latch from the switch member and permitting the spring to move the switch member into closed position, said aperture blade, exposure blade and switch member being so constructed and arranged as to operate in synchronism upon release of the latch from the switch member.

7. In a camera shutter and switch mechanism, a support, a switch member carried by and movable with respect to the support about a first pivotal axis, said switch member being adapted to complete an electric circuit including a flash lamp, an aperture blade carried by and movable with respect to the support, an exposure blade connected to the aperture blade and movable about a second pivotal axis, a latch carried by and movable with respect to the support about a third pivotal axis, said latch releasably maintaining the switch member in open position, means including the switch member for preventing movement of the exposure blade in one direction about said first pivotal axis while the switch member is maintained in open position, means for releasing the latch from the switch member, and resilient means urging the switch member into closed position about said first pivotal axis and the exposure blade in said one direction about said second pivotal axis upon release of the switch member, said aperture blade, exposure blade and switch member being so constructed and arranged as to operate in synchronism upon release of the latch from the switch member.

8. In a camera shutter and switch mechanism, a support, a switch member carried by and movable with respect to the support about a first pivotal axis, said switch member being adapted to complete an electric circuit including a flash lamp, a first spring normally and yieldingly urging the switch member into closed position about said first pivotal axis, an aperture blade carried by and movable with respect to the support, an exposure blade connected to the aperture blade and movable about a second pivotal axis, a second spring normally and yieldingly urging the exposure blade in one direction about said second pivotal axis, a latch carried by and movable with respect to the support about a third pivotal axis, said latch releasably maintaining the switch member in open position, means including the switch member for preventing movement of the exposure blade in said one direction about said second pivotal axis while the switch member is maintained in open position, means for releasing the latch from the switch member and permitting the first spring to move the switch member into closed position about said first pivotal axis and the second spring to move the exposure blade in said one direction about said second pivotal axis, said aperture blade, exposure blade and switch member being so constructed and arranged as to operate in synchronism upon release of the latch from the switch member.

9. In a camera shutter and switch mechanism, a support, an aperture blade carried by and movable with respect to the support about a first pivotal axis, an exposure blade movable with respect to the aperture blade about a second pivotal axis, a switch member adapted to complete an electric circuit including a flash lamp, a latch carried by the support and releasably maintaining the switch member in open position, a spring for moving the switch member to closed position upon release of the latch, means including the switch member for preventing movement of the exposure blade in one direction about said second pivotal axis while the switch member is maintained in open position, and means responsive to predetermined movement of the aperture blade in one direction about said first pivotal axis for releasing the latch from the switch member and permitting the spring to move the switch member to closed position and the exposure blade to move in said one direction about said second pivotal axis, said aperture blade, exposure blade and switch member being so constructed and arranged as to operate in synchronism upon release of the latch from the switch member.

10. In a camera shutter and switch mechanism, a support, an aperture blade carried by and movable with respect to the support about a first pivotal axis, an exposure blade movable with respect to the aperture blade about a second pivotal axis, a switch member carried by and movable with respect to the support about a third pivotal axis, said switch member being adapted to complete an electric circuit including a flash lamp, a latch carried by and movable with respect to the support about a fourth pivotal axis, said latch releasably maintaining the switch member in open position, a spring for moving the switch member to closed position upon release of the latch, means including the switch member for preventing movement of the exposure blade in one direction about said second pivotal axis while the switch member is maintained in open position, and means responsive to predetermined movement of the aperture blade in one direction about said first pivotal axis for releasing the latch from the spring and permitting the switch member to move to closed position and the exposure blade to move the switch member in said one direction about said second pivotal axis, said aperture blade, exposure blade and switch member being so constructed and arranged as to operate in synchronism upon release of the latch from the switch member.

11. In a camera shutter and switch mechanism, a support, an aperture blade carried by and movable with respect to the support about a first pivotal axis, an exposure blade movable with respect to the aperture blade about a second pivotal axis, a switch member carried by and movable with respect to the support about a third pivotal axis, said switch member being adapted to complete an electric circuit including a flash lamp, a latch carried by and movable with respect to the support about a fourth pivotal axis, a single spring normally and yieldingly urging the switch member into closed position about said third pivotal axis and the latch in a direction about said fourth pivotal axis to engage the switch member, said latch releasably maintaining the switch member in open position against the action of the spring, means including the switch member for preventing movement of the exposure blade in one direction about said second pivotal axis while the switch member is maintained in open position, and means responsive to predetermined movement of the aperture blade in one direction about said first pivotal axis for releasing the latch from the switch member and permitting the spring to move the switch member into closed position and the exposure blade to move in said one direction about said second pivotal axis.

12. In a camera shutter and switch mechanism, a support, an aperture blade carried by and movable with respect to the support about a first pivotal axis, an exposure blade movable with respect to the aperture blade about a second pivotal axis, a first spring normally and yieldingly urging the exposure blade in one direction about said second pivotal axis, a switch member carried by and movable with respect to the support about a third pivotal axis, said switch member being adapted to complete an electric circuit including a flash lamp, a second spring normally and yieldingly urging the switch member into closed position about said third pivotal axis, a latch carried by and movable with respect to the support about a fourth pivotal axis, said latch releasably maintaining the switch member in open position against the action of the second spring, means including the switch member for preventing movement of the exposure blade in one direction about said second pivotal axis while the switch member is maintained in open position, and means responsive to predetermined movement of the aperture blade in one direction about said first pivotal axis for releasing the latch from the switch member and permitting the second spring to move the switch member to closed position and the first spring to move the exposure blade in said one direction about said second pivotal axis.

References Cited in the file of this patent
UNITED STATES PATENTS

| Number | Name | Date |
| --- | --- | --- |
| 2,282,850 | Brownscombe | May 12, 1942 |
| 2,472,587 | Harvey | June 7, 1949 |
| 2,498,277 | Kaplowitz | Feb. 21, 1950 |